(12) United States Patent
Ikari et al.

(10) Patent No.: US 7,473,723 B2
(45) Date of Patent: Jan. 6, 2009

(54) SPECTACLES LENS AND PRODUCTION METHOD THEREOF

(75) Inventors: Keizo Ikari, Chiyoda-ku (JP); Jiro Ariki, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 267 days.

(21) Appl. No.: 10/586,641

(22) PCT Filed: Jan. 19, 2005

(86) PCT No.: PCT/JP2005/000940

§ 371 (c)(1),
(2), (4) Date: Jul. 19, 2006

(87) PCT Pub. No.: WO2005/069061

PCT Pub. Date: Jul. 28, 2005

(65) Prior Publication Data

US 2007/0155867 A1 Jul. 5, 2007

(30) Foreign Application Priority Data

Jan. 20, 2004 (JP) .............................. 2004-011632

(51) Int. Cl.
*C08K 5/3417* (2006.01)
*C08K 5/1535* (2006.01)
(52) U.S. Cl. ........................................ 524/91; 524/111
(58) Field of Classification Search .................. 524/91, 524/11
See application file for complete search history.

(56) References Cited

U.S. PATENT DOCUMENTS

| | | |
|---|---|---|
| 4,576,870 A | 3/1986 | Liebler et al. |
| 5,108,835 A | 4/1992 | Hähnsen et al. |
| 5,514,505 A | 5/1996 | Limburg et al. |
| 5,844,026 A | 12/1998 | Galbo et al. |
| 5,952,096 A | 9/1999 | Yamashita et al. |
| 6,225,375 B1 | 5/2001 | Thibaut et al. |
| 6,790,928 B2 * | 9/2004 | Yoshida et al. ............. 528/196 |

FOREIGN PATENT DOCUMENTS

| | | |
|---|---|---|
| JP | 62-146951 | 6/1987 |
| JP | 01-165419 | 6/1989 |
| JP | 04-292661 | 10/1992 |
| JP | 6-35141 | 5/1994 |
| JP | 07-092301 | 4/1995 |
| JP | 08-314240 | 11/1996 |
| JP | 09-263694 | 10/1997 |
| JP | 09-291205 | 11/1997 |
| JP | 11-080563 | 3/1999 |
| JP | 11-080569 | 3/1999 |
| JP | 2001-526711 | 12/2001 |
| JP | 2003-231803 | 8/2003 |
| JP | 2003-231804 | 8/2003 |
| JP | 2003-231805 | 8/2003 |
| JP | 2003-301101 | 10/2003 |
| JP | 2004-204068 | 7/2004 |
| WO | 98/46342 | 10/1998 |

* cited by examiner

*Primary Examiner*—Kriellion A Sanders
(74) *Attorney, Agent, or Firm*—Wenderoth, Lind & Ponack, L.L.P.

(57) ABSTRACT

A spectacles lens and an optical transparent molded article are provided that are formed from a polycarbonate resin composition comprising:
(1) 100 parts by weight of polycarbonate resin (A),
(2) 0.05 to 0.5 parts by weight of at least one ultraviolet absorber (B) selected from the group consisting of 2-(2'-hydroxy-5'-methylphenyl)benzotriazole (B-1) and 2-(2'-hydroxy-5'-tert-octylphenyl)benzotriazole (B-2),
(3) 0.01 to 0.3 parts by weight of at least one ultraviolet absorber (C) selected from the group consisting of 2-(3-tert-butyl-5-methyl-2-hydroxyphenyl)-5-chlorobenzotriazole (C-1),
2,2'-methylenebis[4-(1,1,3,3-tetramethylbutyl)-6-(2H-benzotriazole) -2-ylphenol] (C-2) and
2-[2-hydroxy-3,5-bis($\alpha,\alpha$-dimethylbenzyl)phenyl]-2H-benzotriazole (C-3), and
(4) 0.0005 to 0.1 parts by weight of lactone compound having a specific structure.

22 Claims, No Drawings

SPECTACLES LENS AND PRODUCTION METHOD THEREOF

TECHNICAL FIELD

This invention relates to a spectacles lens formed from a polycarbonate resin composition which has excellent transparency and ultraviolet absorbability, good molding heat resistance and high reproducibility, hardly undergoes yellowing even if subjected to heat history and has excellent hue and to a method for producing the spectacles lens.

The term "reproducibility" as used herein refers to a property that a resin hardly changes in hue even if a polycarbonate resin molded article or its molding waste is subjected to heat history such as re-extrusion to be reused. That is, it refers to a property that a resin molded article (or its waste) hardly changes in hue even if it is subjected to heat history, thereby making reuse of the molded article possible.

Further, the present invention relates to an optical polycarbonate resin molding material which has excellent transparency and ultraviolet absorbability and hardly undergoes yellowing.

BACKGROUND ART

A polycarbonate resin has a high refractive index and excellent transparency and impact resistance and is recently widely used as a raw material of lenses, particularly a raw material of spectacles lenses. Spectacles lenses made of the polycarbonate resin are thinner, lighter, safer due to significantly high impact strength, and more functional than conventional spectacles lenses and plastic lenses formed by cast polymerization (hereinafter referred to as "cast lenses"). Therefore, they have been increasingly used as vision corrective lenses, sunspectacles lenses and safety spectacles lenses.

Recently, it has been strongly demanded to impart ultraviolet absorbability to spectacles lenses so as to protect the eyes from harmful ultraviolet radiation. For example, cast lenses and spectacles lenses meet the demand by forming a coating layer having ultraviolet absorbability on the surface of the lenses. However, the coating method has a problem of an increase in product cost and a problem of slight yellowing of the lenses. Further, in the case of the cast lenses, an ultraviolet absorber is added at the time of polymerization. However, this method has a problem of inhibition of polymerizability and a problem of significant yellowing of the lenses.

Meanwhile, in the case of the spectacles lenses made of the polycarbonate resin, the polycarbonate resin itself has ultraviolet absorbability, and since the polycarbonate resin is a thermoplastic resin, any ultraviolet absorber can be contained therein easily if the ultraviolet absorber is added at the time of melt molding. It is particularly desired to contain an ultraviolet absorber of long wavelength side. However, the conventional polycarbonate resin is not capable of absorbing ultraviolet radiation of longer than 375 nm by itself, and if it is desired that the resin absorb longer wavelengths than 375 nm, a large amount of an ultraviolet absorber must be added. Ultraviolet absorbers are generally sublimable. Thus, when a large amount of an ultraviolet absorber is added, the ultraviolet absorber sublimes and contaminates a mirror-surface mold upon injection-molding of the polycarbonate resin and significantly damages the appearance of a lens to be obtained accordingly.

In Japanese Patent Publication Nos. 6-035141 and 6-041162, a method is described that comprises adding 0.1 to 20 parts by weight of oligomer-type ultraviolet absorber which hardly sublimes to 100 parts by weight of polycarbonate resin and forming the surface layer of a multilayer laminated sheet or film from the resin at the time of extrusion of the sheet or film. However, its object is to impart weather resistance to the sheet and not optical. Further, some ultraviolet absorbers are capable of absorbing ultraviolet radiation of even longer wavelengths. However, since a polycarbonate resin is yellowed significantly by addition of these ultraviolet absorbers for absorbing long wavelengths, a large amount of a bluing agent needs to be added to eliminate a yellow tinge. However, this method has a problem that when the polycarbonate resin is used for forming lenses, the transparency of the lenses is impaired by a large amount of the bluing agent, and this method can only provide significantly opaque lenses having low luminous transmittance.

Further, Japanese Patent Laid-Open Publication No. 7-092301 proposes a plastic lens which contains an ultraviolet absorber and an infrared absorber to prevent transmission of ultraviolet radiation and near-infrared radiation. However, lenses obtained by this method have unsatisfactory transparency.

Meanwhile, Japanese Patent Laid-Open Publication No. 62-146951 describes a polycarbonate resin composition having light resistance improved by containing 0.001 to 5 parts by weight of alkylidene bis(benzotriazolylphenol) compound represented by a specific structural formula based on 100 parts by weight of polycarbonate resin. This patent publication indicates the results of preparing test pieces by adding 0.30 wt % of the above 5 specific compounds to polycarbonate resins, irradiating the test pieces with ultraviolet radiation by a high-pressure mercury lamp and measuring the degree of yellowness of the test pieces and changes thereof ($\Delta YI$). The results merely indicate that the changes in the degree of yellowness were decreased by addition of the above specific compounds.

Japanese Patent Laid-Open Publication No. 4-292661 describes a resin composition containing 0.01 to 0.15 parts by weight of ultraviolet absorber having an absorption maximum at a wavelength of 280 to 360 nm and no absorption at a wavelength of 400 nm based on 100 parts by weight of transparent thermoplastic resin including a polycarbonate resin. Since a silver salt film formed from this resin composition has a sensitivity peak at a wavelength of 400 nm, the film has been developed for a camera lens having a transmittance of light having a wavelength of 400 nm of not lower than 80%.

Further, Japanese Patent Laid-Open Publication Nos. 9-263694 and 9-291205 describe a resin composition containing an ultraviolet absorber having an absorption maximum at wavelengths of 300 to 345 nm and 346 to 400 nm based on 100 parts by weight of transparent thermoplastic resin including a polycarbonate resin. Although this composition has been developed for a spectacles lens having excellent transparency and high ultraviolet absorbability, it shows a significant change in hue and unsatisfactory molding heat resistance when subjected to heat history such as re-extrusion to recycle product wastes.

Further, Japanese Patent Laid-Open Publication Nos. 2003-231803, 2003-231804 and 2003-231805 describe a resin composition containing 0.003 to 1 part by weight of specific benzotriazole-based ultraviolet absorber and benzofurano-2-one type compound based on 100 parts by weight of aromatic polycarbonate resin. Although this composition is a resin composition having an improved balance in between hydrolysis resistance, impact resistance and a mold staining property, it has poor hue and also shows a significant change in hue and unsatisfactory molding heat resistance when subjected to heat history such as re-extrusion.

DISCLOSURE OF THE INVENTION

A first object of the present invention is to provide a spectacles lens which is formed from a polycarbonate resin composition and which has sufficient molding heat resistance to endure being held at high temperatures for a long time at the time of lens molding such as extrusion compression molding and shows a small change in hue when subjected to heat history such as re-extrusion to recycle product wastes.

A second object of the present invention is to provide a spectacles lens which is formed from a polycarbonate resin composition and which has excellent impact resistance and transparency and can cut ultraviolet radiation of specific wavelengths nearly completely.

A third object of the present invention is to provide a spectacles lens which is formed from a polycarbonate resin composition and which is hardly yellowed by ultraviolet radiation and is free from contamination of mold mirror surface by sublimation of ultraviolet absorber at the time of molding.

A fourth object of the present invention is to provide a spectacles lens which is formed from a polycarbonate resin composition, does not substantially transmit a wavelength of 385 nm and has high total light transmittance.

Another object of the present invention is to provide an optical molding material which is formed from a polycarbonate resin composition and which has sufficient molding heat resistance to endure being held at high temperatures for a long time at the time of lens molding such as extrusion compression molding and shows a small change in hue when subjected to heat history such as re-extrusion to recycle product wastes.

Still another object of the present invention is to provide an optical molding material which is formed from a polycarbonate resin composition and which has excellent transparency, can cut ultraviolet radiation of specific wavelengths nearly completely and is hardly yellowed by ultraviolet radiation.

To achieve the above objects, the present inventors have made intensive studies on heat stabilizers and ultraviolet absorbers usable in polycarbonate resins. As a result, they have found that when specific amounts of a specific heat stabilizer and two specific types of ultraviolet absorbers are used in combination, a change in hue by heat at the time of molding is improved and ultraviolet radiation of 385 nm can be absorbed nearly completely without impairing moldability and without impairing the transparency of a molded article such as a lens. Based on this finding, the present inventors have achieved the present invention.

That is, according to the present invention, the following spectacles lens, production method thereof, optical molding material and optical transparent molded article are provided.

[I] A spectacles lens formed from a polycarbonate resin composition comprising:
(1) 100 parts by weight of polycarbonate resin (A),
(2) 0.05 to 0.5 parts by weight of at least one ultraviolet absorber (B) selected from the group consisting of 2-(2'-hydroxy-5'-methylphenyl)benzotriazole (B-1) and 2-(2'-hydroxy-5'-tert-octylphenyl)benzotriazole (B-2),
(3) 0.01 to 0.3 parts by weight of at least one ultraviolet absorber (C) selected from the group consisting of 2-(3-tert-butyl-5-methyl-2-hydroxyphenyl)-5-chlorobenzotriazole (C-1), 2,2'-methylenebis[4-(1,1,3,3-tetramethylbutyl)-6-(2H-benzotriazole)-2-ylphenol] (C-2) and 2-[2-hydroxy-3,5-bis(α,α-dimethylbenzyl)phenyl]-2H-benzotriazole (C-3), and (4) 0.0005 to 0.1 parts by weight of lactone compound (D) represented by the following formula (1):

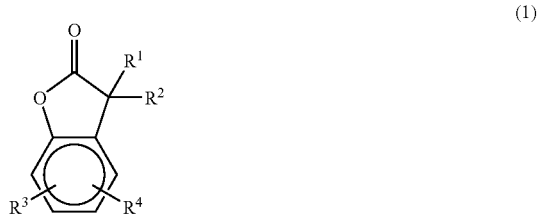

(wherein $R^1$, $R^2$, $R^3$ and $R^4$ each independently represent a hydrogen atom, an alkyl group having 1 to 20 carbon atoms, an aralkyl group having 7 to 20 carbon atoms or an aryl group having 6 to 15 carbon atoms, and the aralkyl group and the aryl group may have a substituent.)

[II] A method for producing a spectacles lens by melting the polycarbonate resin composition of the above [I], filling it in a mold and compression-molding the molten composition in the mold.

[III] An optical molding material comprising the polycarbonate resin composition of the above [I].

[IV] A method for producing an optical transparent molded article by melting the molding material of the above [III], filling in a mold and compression-molding the molten material in the mold.

The spectacles lens or optical transparent molded article of the present invention is formed from a resin composition prepared by adding specific amounts of the two specific types of ultraviolet absorbers (B) and (C) and the specific stabilizer (D) to the polycarbonate resin (A).

Hereinafter, the polycarbonate resin composition of the present invention and a spectacles lens and an optical transparent molded article that are formed from the composition will be further described.

The polycarbonate resin (A) used in the present invention is an aromatic polycarbonate resin obtained by reacting a dihydric phenol with a carbonate precursor. Specific examples of the dihydric phenol used herein include bis(hydroxyaryl)alkane such as 2,2-bis (4-hydroxyphenyl)propane (commonly known as bisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-3-methylphenyl)propane, 1,1-bis(4-hydroxy-3-tert-butylphenyl)propane, 2,2-bis(4-hydroxy-3-bromophenyl)propane, 2,2-bis(4-hydroxy-3,5-dibromophenyl)propane and 2,2-bis(4-hydroxy-3,5-dichlorophenyl)propane; bis(hydroxyphenyl)cycloalkane such as 1,1-bis(hydroxyphenyl)cyclopentane and 1,1-bis (hydroxyphenyl) cyclohexane; dihydroxyaryl ether such as 4,4'-dihydroxydiphenyl ether and 4,4'-dihydroxy-3,3'-dimethyldiphenyl ether; dihydroxydiaryl sulfide such as 4,4'-dihydroxydiphenyl sulfide and 4,4'-dihydroxy-3,3'-dimethyldiphenyl sulfide; dihydroxydiaryl sulfoxide such as 4,4'-dihydroxydiphenyl sulfoxide and 4,4'-dihydroxy-3,3'-dimethyldiphenyl sulfoxide; and dihydroxydiaryl sulfone such as 4,4'-dihydroxydiphenyl sulfone and 4,4'-dihydroxy-3,3'-dimethyldiphenyl sulfone. These dihydric phenols may be used alone or in combination of two or more.

Of the above dihydric phenols, the bis(hydroxyaryl)alkane, particularly, 2,2-bis(4-hydroxyphenyl)propane (bisphenol A) is preferably contained as a main dihydric phenol component. Particularly, an aromatic polycarbonate resin in which bisphenol A constitutes at least 70 mol %, particularly at least 80 mol % of all dihydric phenol components is preferred. The most preferable is an aromatic polycarbonate resin whose dihydric phenol component is substantially bisphenol A.

The polycarbonate resin can be produced by a method and means known per se. A basic method and means therefor will be described briefly. In a solution method using phosgene as a carbonate precursor, a dihydric phenol component is generally reacted with phosgene in the presence of an acid binder and an organic solvent. As the acid binder, an alkali metal hydroxide such as sodium hydroxide or potassium hydroxide or an amine compound such as pyridine is used, for example. As the organic solvent, a halogenated hydrocarbon such as methylene chloride or chlorobenzene is used, for example. Further, to accelerate the reaction, a catalyst such as tertiary amine or a quaternary ammonium salt can be used. A terminal blocking agent, e.g. phenol or an alkyl substituted phenol such as p-tert-butylphenol, is desirably used as a molecular weight modifier. The reaction temperature is generally 0 to 40° C., the reaction time is several minutes to 5 hours, and the pH during the reaction is preferably kept at 10 or higher.

A transesterification method (fusion method) using a carbonic diester as a carbonate precursor is a method comprising distilling out an alcohol or phenol produced while agitating predetermined amounts of a dihydric phenol component and the carbonic diester under heating in the presence of inert gas. Although varying depending on the boiling point of the alcohol or phenol produced or the like, the reaction temperature is generally 120 to 350° C. The reaction is carried out under reduced pressure from the start while the alcohol or phenol produced is being distilled out. Further, to accelerate the reaction, a commonly used transesterification reaction catalyst may be used. Illustrative examples of the carbonic diester used in this transesterification reaction include diphenyl carbonate, dinaphthyl carbonate, dimethyl carbonate, diethyl carbonate and dibutyl carbonate. Diphenyl carbonate is particularly preferred.

The molecular weight of the polycarbonate resin (A) used in the present invention is preferably 17,000 to 30,000, particularly preferably 20,000 to 26,000, in terms of viscosity average molecular weight. The spectacles lens and optical transparent molded article are precision molded articles, and it is important to transfer the mirror surface of a mold accurately so as to impart a predetermined curvature and frequency. Although a low-viscosity resin having good melt flowability is desired, impact strength which is a characteristic of the polycarbonate resin cannot be retained if the viscosity is too low. The viscosity average molecular weight (M) of the polycarbonate resin is a value obtained by measuring the specific viscosity (ηsp) of solution prepared by dissolving 0.7 g of the polycarbonate resin in 100 ml of methylene chloride at 20° C. by use of Ostwald viscometer and substituting the specific viscosity (η sp) into the following formula:

$$\eta sp/c = [\eta] + 0.45 \times [\eta]^2 c \quad ([\eta] \text{ is intrinsic viscosity})$$

$$[\eta] = 1.23 \cdot 10^{-4} M^{0.83}$$

$$c = 0.7$$

The resin composition of the present invention contains the two types of ultraviolet absorbers (B) and (C) that differ in wavelength absorption property in the above polycarbonate resin (A). The ultraviolet absorber (B) is at least one ultraviolet absorber selected from the group consisting of 2-(2'-hydroxy-5'-methylphenyl)benzotriazole (B-1) and 2-(2'-hydroxy-5'-tert-octylphenyl)benzotriazole (B-2). This ultraviolet absorber (B) has an absorption maximum around a wavelength of 340 nm. The ultraviolet absorber (C) is at least one ultraviolet absorber selected from the group consisting of 2-(3-tert-butyl-5-methyl-2-hydroxyphenyl)-5-chlorobenzotriazole (C-1), 2,2'-methylenebis[4-(1,1,3,3-tetramethylbutyl)-6-(2H-benzotriazole)-2-ylphenol] (C-2) and 2-[2-hydroxy-3,5-bis(α,α-dimethylbenzyl)phenyl]-2H-benzotriazole (C-3). This ultraviolet absorber (C) has absorption maximum in a wavelength range of 343 to 360 nm. The absorption maximums of these two types of ultraviolet absorbers (B) and (C) are absorption spectra measured in a chloroform solution at a concentration of 10 mg/l by use of a quartz cell having a layer thickness of 10 mm.

When either of these two types of ultraviolet absorbers (B) and (C) is used alone, absorption of ultraviolet radiation having a wavelength of 385 nm is unsatisfactory, or when the ultraviolet absorber is added in such a large amount that the absorption becomes satisfactory, the ultraviolet absorber sublimes at the time of molding, resulting in an increase in the haze of the lens and a decrease in the hue of the lens. When the above two specific types of ultraviolet absorbers (B) and (C) are used in combination, even in relatively small amounts, a molded plate having a thickness of 5 mm shows a spectral transmittance at 385 nm of not higher than 0.1% and can absorb ultraviolet radiation of this wavelength nearly completely, shows a spectral transmittance at 400 nm of not higher than 50% and retains a total light transmittance of not lower than 87%, and the hue of the lens is also good. The lens also has an advantage that it is hardly yellowed by ultraviolet radiation.

The ultraviolet absorber (B) is preferably 2-(2'-hydroxy-5'-tert-octylphenyl)benzotriazole (B-2). The ultraviolet absorber (C) is preferably at least one ultraviolet absorber selected from the group consisting of 2-(3-tert-butyl-5-methyl-2-hydroxyphenyl)-5-chlorobenzotriazole (C-1) and 2,2'-methylenebis[4-(1,1,3,3-tetramethylbutyl)-6-(2H-benzotriazole)-2-ylphenol] (C-2).

The ultraviolet absorber (B) is contained in an amount of 0.05 to 0.5 parts by weight, preferably 0.1 to 0.4 parts by weight, particularly preferably 0.1 to 0.35 parts by weight, based on 100 parts by weight of the polycarbonate resin. When it is smaller than 0.05 parts by weight, ultraviolet absorbability is unsatisfactory, while when it is larger than 0.5 parts by weight, ultraviolet absorbability is no longer improved, and sublimation at the time of molding, an increase in haze and deterioration in hue become marked.

The ultraviolet absorber (C) is contained in an amount of 0.01 to 0.3 parts by weight, preferably 0.01 to 0.27 parts by weight, particularly preferably 0.01 to 0.25 parts by weight, based on 100 parts by weight of the polycarbonate resin. When it is smaller than 0.01 parts by weight, ultraviolet absorbability is unsatisfactory, while when it is larger than 0.3 parts by weight, the hue of the ultraviolet absorber (C) deteriorates significantly, resulting in an opaque lens.

Further, it is desired to set the compounding ratio (weight) R represented by the expression R=(C)/(B) between the ultraviolet absorber (B) and the ultraviolet absorber (C) in a range of preferably 0.05 to 4, more preferably 0.05 to 3, much more preferably 0.05 to 1, particularly preferably 0.05 to 0.5. When the compounding ratio R is lower than 0.05, ultraviolet absorbability is unsatisfactory, while when the compounding ratio R is higher than 4, deterioration in hue tends to become marked.

In the polycarbonate resin composition of the present invention, the lactone compound (D) represented by the following formula (1) is added to the polycarbonate resin (A) together with the two types of ultraviolet absorbers (B) and (C). The lactone compound (D) represented by the formula (1) is known as a heat stabilizer for a polycarbonate resin. In the resin composition of the present invention, a combination of the two types of ultraviolet absorbers (B) and (C) with a very small amount of the lactone compound (D) significantly improves the molding heat resistance and melt heat resistance of the resin.

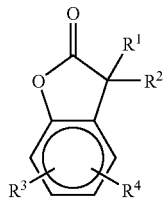

(1)

(wherein $R^1$, $R^2$, $R^3$ and $R^4$ each independently represent a hydrogen atom, an alkyl group having 1 to 20 carbon atoms, an aralkyl group having 7 to 20 carbon atoms or an aryl group having 6 to 15 carbon atoms, and the aralkyl group and the aryl group may have a substituent.)

In the lactone compound (D) of the above formula (1), when $R^1$, $R^2$, $R^3$ and $R^4$ are an alkyl group having 1 to 20 carbon atoms, the alkyl group may be a linear or branched alkyl group.

Illustrative examples thereof include methyl, ethyl, propyl, isopropyl, butyl, isobutyl, pentyl, 2-ethylbutyl, hexyl, heptyl, octyl, 2-ethylhexyl, nonyl, decyl, dodecyl, tetradecyl, octadecyl and eicosyl groups.

Illustrative examples of the aralkyl group having 7 to 20 carbon atoms include benzyl, 2,6-ditertiarybutyl-4-methylbenzyl, phenethyl, phenylpropyl, naphthylmethyl and 2-phenylisopropyl groups.

Illustrative examples of the aryl group having 6 to 15 carbon atoms include phenyl, dimethylphenyl, tolyl and naphthyl groups.

$R^1$ and $R^2$ are preferably a combination of a hydrogen atom and an aryl group having 7 to 20 carbon atoms. More preferably, $R^1$ is a hydrogen atom and $R^2$ is a phenyl group represented by the following formula (2):

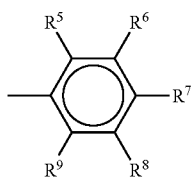

(2)

(wherein $R^5$, $R^6$, $R^7$, $R^8$ and $R^9$ each independently represent a hydrogen atom, an alkyl group having 1 to 4 carbon atoms or an alkoxy group having 1 to 4 carbon atoms.)

Of these five substituents $R^5$ to $R^9$ in the above formula (2), two to five of them are preferably a hydrogen atom and the remaining zero to three substituents are preferably an alkyl group having 1 to 4 carbon atoms. More specifically, the formula (2) is preferably a 2,3-dimethylphenyl group or a 3,4-dimethylphenyl group and is particularly preferably a 3,4-dimethylphenyl group.

$R^3$ and $R^4$ are preferably a hydrogen atom or an alkyl group having 1 to 20 carbon atoms, particularly preferably an alkyl group having 1 to 6 carbon atoms. As the alkyl group having 1 to 6 carbon atoms, a-tert-butyl group is preferred.

Preferred specific compounds of the above lactone compound (D) are 5,7-di-tert-butyl-3-(3,4-dimethyl-phenyl)-3H-benzofuran-2-one and 5,7-di-tert-butyl-3-(2,3-dimethyl-phenyl)-3H-benzofuran-2-one.

The above lactone compound (D) is used in an amount of 0.0005 to 0.1 parts by weight, preferably 0.0005 to 0.05 parts by weight, more preferably 0.0005 to 0.012 parts by weight, based on 100 parts by weight of the polycarbonate resin (A). When the amount is smaller than 0.0005 parts by weight, the effect is small and satisfactory molding heat resistance and melt heat resistance are not obtained, while when it is larger than 0.1 parts by weight, total light transmittance deteriorates disadvantageously.

In preparation of the polycarbonate resin composition of the present invention, when and how the ultraviolet absorber (B), the ultraviolet absorber (C) and the lactone compound (D) are added are not particularly limited. They may be added during or after polymerization of the polycarbonate resin. Alternatively, they may be mixed and melt-kneaded with the polycarbonate resin which is in the form of powder, pellets or beads by a mixing device such as a tumbler, ribbon blender or high-speed mixer. The ultraviolet absorber (B) and the ultraviolet absorber (C) may be added simultaneously or in any order.

To the polycarbonate resin composition of the present invention, a phosphorus stabilizer [E] may also be added in an amount of 0.001 to 0.2 parts by weight based on 100 parts by weight of the polycarbonate resin. Illustrative examples of the phosphorus stabilizer include phosphorous acid, phosphoric acid, phosphonous acid, phosphonic acid, and their esters. Specific examples thereof include triphenyl phosphite, tris(nonylphenyl) phosphite, tris(2,4-di-tert-butylphenyl)phosphite, tris(2,6-di-tert-butylphenyl)phosphite, tridecylphosphite, trioctyl phosphate, trioctadecyl phosphite, didecyl monophenyl phosphate, dioctyl monophenyl phosphite, diisopropyl monophenyl phosphite, monobutyl diphenyl phosphite, monodecyl diphenyl phosphate, monooctyl diphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, bis(2,4-di-tert-butylphenyl)-4-phenyl-phenyl phosphonite, and bis(2,4-di-tert-butylphenyl)-3-phenyl-phenyl phosphonite.

Of these, tris(2,4-di-tert-butylphenyl)phosphite, tris(2,6-di-tert-butylphenyl)phosphite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, bis(2,4-di-tert-butylphenyl)-4-phenyl-phenyl phosphonite and bis(2, 4-di-tert-butylphenyl)-3-phenyl-phenyl phosphonite are used.

Tetrakis(2,4-di-tert-butylphenyl)-4,4'-biphenylene diphosphonite is particularly preferably used.

To the polycarbonate resin composition of the present invention, a generally known hindered phenol stabilizer (F) may also be added to prevent oxidation. Illustrative examples of the hindered phenol stabilizer include pentaerythritol tetrakis(3-mercaptopropionate), pentaerythritol tetrakis(3-laurylthiopropionate), glycerol-3-stearylthiopropionate, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl) benzene, N,N-hexamethylenebis(3,5-di-tert-butyl-4-hydroxyhydrocinnamide), 3,5-di-tert-butyl-4-hydroxybenzylphosphonate-diethyl ester, tris(3,5-di-tert-butyl-4-hydroxybenzyl)isocyanurate and 3,9-bis{1,1-dimethyl-2-[β-(3-tert-butyl-4-hydroxy-5-methylphenyl)propionyloxy]ethyl}-2,4,8,10-tetraoxaspiro (5,5)undecane. Octadecyl-3-(3,5-di-tert-butyl-4-hydroxyphenyl)propionate is particularly preferably used. These stabilizers (F) are preferably used in an amount of 0.001 to 0.1 parts by weight based on 100 parts by weight of the polycarbonate resin.

A mold releasing agent may be added to the polycarbonate resin composition of the present invention. As the mold releasing agent, saturated fatty acid esters are commonly used. For example, monoglycerides such as monoglyceride stearate, lower fatty acid esters such as stearic stearate, higher fatty acid esters such as sebacic behenate and erythritol esters such as pentaerythritol tetrastearate are used in an amount of 0.01 to 1 part by weight based on 100 parts by weight of the polycarbonate resin (A).

The polycarbonate resin composition of the present invention may contain a bluing agent to remove a yellow tinge in a lens which is caused by the polycarbonate resin or the ultraviolet absorbers when the composition is formed into the spectacles lens or an optical transparent molded article. As the bluing agent, any bluing agent which is used in polycarbonate resins can be used without any particular problems. In general, anthraquinone dye is easy to obtained and preferred.

Specific examples of the bluing agent include Solvent Violet 13 (CA. No (hue index No) 60725; trade name "Macrolex Violet B" of Bayer AG, "Diaresin Blue G" of Mitsubishi Chemical Corporation, "Sumiplast Violet B" of Sumitomo Chemical Co., Ltd.], Solvent Violet 31 (CA. No 68210; trade name "Diaresin Violet D" of Mitsubishi Chemical Corporation), Solvent Violet 33 [CA. No 60725; trade name "Diaresin Blue J" of Mitsubishi Chemical Corporation], Solvent Blue 94 (CA. No 61500; trade name "Diaresin Blue N" of Mitsubishi Chemical Corporation), Solvent Violet 36 (CA. No 68210; trade name "Macrolex Violet 3R" of Bayer AG), Solvent Blue 97 (trade name "Macrolex Blue RR" of Bayer AG), and Solvent Blue 45 (CA. No 61110; trade name "Tetrasol Blue RLS" of Sandoz Ltd.). These bluing agents are generally contained in a concentration of 0.1 to 1.2 ppm in the polycarbonate resin composition. When a considerably large amount of the bluing agent is contained, absorption by the bluing agent is so strong that luminous transmittance lowers, resulting in an opaque lens. In particular, in the case of a vision corrective lens, the lens has a thick portion and a thin portion and has a great variation in thickness. Accordingly, when absorption by the bluing agent is strong, a difference in hue ascribable to a difference in thickness between the central portion and peripheral portion of the lens occurs, resulting in significantly poor appearance of the lens.

The spectacles lens formed from the polycarbonate resin composition of the present invention has significantly excellent transparency and shows a total light transmittance of not lower than 87% when the thickness is 5 mm.

Further, the spectacles lens of the present invention has a low degree of yellowness in addition to high transparency. The degree of yellowness b* at a thickness of 5 mm is preferably 0.3 to 1.6, more preferably 0.4 to 1.4.

When the value of this degree of yellowness (b*) is less than 0.3, a formed lens shows a blue tinge, while when it is more than 1.6, the lens shows a yellow tinge.

Since the spectacles lens of the present invention uses a polycarbonate resin as a substrate, it has high impact resistance and a high refractive index and is excellent in an ultraviolet absorbing effect, particularly an effect of absorbing harmful ultraviolet radiation of 385 to 400 nm.

In addition to the spectacles lens, the polycarbonate resin composition of the present invention can be used as a molding material for obtaining various optical transparent molded articles by use of its optical properties. Illustrative examples of the optical transparent molded article include lenses (camera lenses) other than spectacles lenses, prisms, transparent protective films, transparent sheets, protective sheets, automobile headlamps, lamp covers, helmet shields, automobile windshield covers, protective masks, hazard-resistant masks, and goggles.

The polycarbonate resin composition of the present invention can be molded into various molded articles in accordance with a melt molding method known per se. In particular, when a spectacles lens or an optical molded article is to be obtained, a method comprising melting the composition, filling it in a mold and compression-molding it into a desired shape in the mold can be used. This molding method is also called an extrusion pressure-molding method. By use of this compression-molding method, residual deflection in a molded article is reduced, and a molded article having no weld line can be obtained. In particular, a molded article of high quality as a spectacles lens can be obtained.

EXAMPLES

Hereinafter, the present invention will be further described by use of Examples. "Parts" indicate "parts by weight", and evaluations were made in the following manner.
(1) Spectral Transmittance: Sample plates obtained in Examples were measured in a wavelength range of 300 to 500 nm by use of U-4100 of Hitachi, Ltd.
(2) Total Light Transmittance and Haze: The sample plates obtained in Examples were measured by use of a C light source and NDH-2000 of Nippon Denshoku Industries Co., Ltd. in accordance with JIS K-7361.
(3) Degree of Yellowness (b*): The sample plates obtained in Examples were measured by transmission at a view angle of 2° by use of a C light source and Color-Eye700A of Gretamacbeth.
(4) Molding Heat Resistance (Reproducibility): The hues (b*, b'*) of sample plates (70 mm in length×50 mm in width×5 mm in thickness) obtained by molding virgin pellets and repellets obtained in Examples continuously by an injection molding machine at a cylinder temperature of 300° C. were measured by use of Color-Eye700A of Gretamacbeth, and the degree of dishueation was indicated by Δb* (=b'*−b*). The smaller the Δb* is, the smaller a change in hue becomes, advantageously.
(5) Melt Heat Resistance: 5 g of the virgin pellets obtained in each of Examples was filled in two aluminum rings (inner diameter: 30 mm, depth: 5 mm) placed on a Teflon plate.

After one of the rings was left to stand for 10 minutes and the other ring was left to stand for 20 minutes at 280° C. in an oven (HIGH TEMP OVEN PHH-200 of Tabai Espec Corporation) in a circulating air atmosphere, the rings were taken out of the oven and left to cool at room temperature (23° C., 50% RH). Then, disks were removed from the aluminum rings and measured for total light transmittance (Tt) in accordance with the method in the above (2) and for L, a and b values by use of a color-difference meter (SE-2000 of Nippon Denshoku Industries Co., Ltd.). A change in hue (ΔE) was determined by the following formula.

$$\Delta E = [(L'-L)^2 + (a'-a)^2 + (b'-b)^2]^{1/2}$$

(L, a, b are values of the disk left to stand for 10 minutes, and L', a', b' are values of the disk left to stand for 20 minutes.)

Example 1

To 100 parts of polycarbonate resin powder with a viscosity average molecular weight of 22,400 obtained by interfacial-polymerizing bisphenol A and phosgene in the usual manner, 0.3 parts of 2-(2'-hydroxy-5'-tert-octylphenyl) benzotriazole (absorption maximum: 340 nm) as the ultraviolet absorber (B), 0.04 parts of 2,2'-methylenebis[4-(1,1,3,3-tetramethylbutyl)-6-(2H-benzotriazole-2-yl)phenol] (absorption maximum: 349 nm) as the ultraviolet absorber (C), 0.0027 parts of 5,7-di-tert-butyl-3-(3,4-dimethyl-phenyl)-3H-benzofuran-2-one (compound of the above formula (1) wherein $R^1$ represents a hydrogen atom, $R^2$ represents a 3,4-dimethylphenyl group, and $R^3$ and $R^4$ represent a tert-butyl group) as the lactone compound (D), 0.25 parts of stearic stearate (mold releasing agent), 0.03 parts of the following phosphorus stabilizer (e) and 0.5 ppm of compound represented by the following formula as a bluing agent were added. After they were fully mixed in a tumbler, the mixture was pelletized at 260 to 280° C. by a 30-mm vented extruder (virgin pellets). Further, to examine the hue of repellets, pelletization was carried out two more times in succession under the same extrusion conditions to obtain repellets. These pellets were molded by an injection molding machine at a cylinder temperature of 300° C. in accordance with the above evaluation method to obtain a sample plate (70 mm in length× 50 mm in width×5 mm in thickness). By use of this sample plate, a b* value, a b'* value, haze, total light transmittance and spectral transmittances at 385 nm and 400 nm were measured, and the evaluation results are shown in Table 1. Further, the above melt heat resistance was evaluated by use of the virgin pellets, and the evaluation result is shown in Table 1.

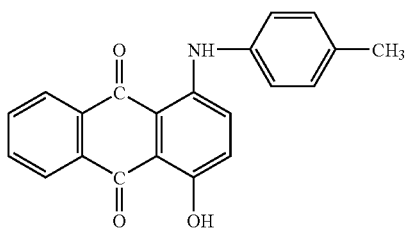

Phosphorus Stabilizer (e): mixture of the following components e-1, e-2 and e-3 in 71:15:14 (weight ratio)

Component e-1: mixture of tetrakis(2,4-di-tert-butylphenyl)-4,4'-biphenylene diphosphonite, tetrakis(2,4-di-tert-butylphenyl)-4,3'-biphenylene diphosphonite, and tetrakis(2,4-di-tert-butylphenyl)-3,3'-biphenylene diphosphonite in 100:50:10 (weight ratio)

Component e-2: mixture of bis(2,4-di-tert-butylphenyl)-4-phenyl-phenyl phosphonite and bis(2,4-di-tert-butylphenyl)-3-phenyl-phenyl phosphonite in 5:3 (weight ratio)

Component e-3: tris(2,4-di-tert-butylphenyl)phosphite

Example 2

A sample plate was obtained in the same manner as in Example 1 except that the amount of 5,7-di-tert-butyl-3-(3,4-dimethyl-phenyl)-3H-benzofuran-2-one was changed to 0.01 parts. The evaluation results are shown in Table 1.

Example 3

A sample plate was obtained in the same manner as in Example 1 except that the amount of 5,7-di-tert-butyl-3-(3,4-dimethyl-phenyl)-3H-benzofuran-2-one was changed to 0.05 parts. The evaluation results are shown in Table 1.

Example 4

A sample plate was obtained in the same manner as in Example 2 except that 0.05 parts of octadecyl-3-(3,5-di-tert-4-hydroxyphenyl)propionate was also added. The evaluation results are shown in Table 1.

Example 5

A sample plate was obtained in the same manner as in Example 1 except that 0.005 parts of octadecyl-3-(3,5-di-tert-4-hydroxyphenyl)propionate and 0.01 parts of tris(2,4-di-tert-butylphenyl)phosphite were also added. The evaluation results are shown in Table 1.

Example 6

Pellets and a sample plate were obtained in the same manner as in Example 2 except that 0.05 parts of octadecyl-3-(3,5-di-tert-4-hydroxyphenyl)propionate and 0.03 parts of tris(2,4-di-tert-butylphenyl)phosphite were also added. The evaluation results are shown in Table 1.

Example 7

A sample plate was obtained in the same manner as in Example 3 except that 0.05 parts of octadecyl-3-(3,5-di-tert-4-hydroxyphenyl)propionate and 0.03 parts of tris(2,4-di-tert-butylphenyl)phosphite were also added. The evaluation results are shown in Table 1.

Example 8

A sample plate was obtained in the same manner as in Example 1 except that 0.3 parts of 2-(2'-hydroxy-5'-methylphenyl)benzotriazole was used as the ultraviolet absorber (B). The evaluation results are shown in Table 1.

Comparative Example 1

A sample plate was obtained in the same manner as in Example 1 except that 5,7-di-tert-butyl-3-(3,4-dimethyl-phe-

Comparative Example 2

A sample plate was obtained in the same manner as in Example 1 except that the amount of 5,7-di-tert-butyl-3-(3,4-dimethyl-phenyl)-3H-benzofuran-2-one was changed to 0.0003 parts. The evaluation results are shown in Table 1. A change in hue by reproduction was significant.

Comparative Example 3

Pellets and a sample plate were obtained in the same manner as in Example 1 except that the amount of 5,7-di-tert-butyl-3-(3,4-dimethyl-phenyl)-3H-benzofuran-2-one was changed to 0.15 parts. The evaluation results are shown in Table 1. A drop in total light transmittance (Tt) was significant.

Comparative Example 4

A sample plate was obtained in the same manner as in Example 4 except that 5,7-di-tert-butyl-3-(3,4-dimethyl-phenyl)-3H-benzofuran-2-one was not added. The evaluation results are shown in Table 1. A change in hue by reproduction was significant.

Comparative Example 5

A sample plate was obtained in the same manner as in Example 5 except that the amount of 5,7-di-tert-butyl-3-(3,4-dimethyl-phenyl)-3H-benzofuran-2-one was changed to 0.0003 parts. The evaluation results are shown in Table 1. A change in hue by reproduction was significant.

Comparative Example 6

Pellets and a sample plate were obtained in the same manner as in Comparative Example 3 except that 0.01 parts of octadecyl-3-(3,5-di-tert-4-hydroxyphenyl)propionate and 0.03 parts of tris(2,4-di-tert-butylphenyl)phosphite were also added. The evaluation results are shown in Table 1. A drop in total light transmittance (Tt) was significant.

Comparative Example 7

A sample plate was obtained in the same manner as in Example 2 except that the ultraviolet absorber (B) was not used and 0.34 parts of 2,2'-methylenebis[4-(1,1,3,3-tetramethylbutyl)-6-(2H-benzotriazole-2-yl)phenol] was used as the ultraviolet absorber (C). The evaluation results are shown in Table 1. A change in hue by reproduction was significant.

Example 9

Pellets and a sample plate were obtained in the same manner as in Example 1 except that 0.02 parts of 2-(3-tert-butyl-5-methyl-2-hydroxyphenyl)-5-chlorobenzotriazole (absorption maximum: 353 nm) was used as the ultraviolet absorber (C). The evaluation results are shown in Table 2.

Example 10

Pellets and a sample plate were obtained in the same manner as in Example 9 except that the amount of 5,7-di-tert-butyl-3-(3,4-dimethyl-phenyl)-3H-benzofuran-2-one was changed to 0.01 parts and the amount of the bluing agent was changed to 0.6 ppm. The evaluation results are shown in Table 2.

Example 11

Pellets and a sample plate were obtained in the same manner as in Example 10 except that 0.05 parts of octadecyl-3-(3,5-di-tert-4-hydroxyphenyl)propionate was also added. The evaluation results are shown in Table 2.

Example 12

Pellets and a sample plate were obtained in the same manner as in Example 9 except that 0.005 parts of octadecyl-3-(3,5-di-tert-4-hydroxyphenyl)propionate and 0.01 parts of tris(2,4-di-tert-butylphenyl)phosphite were also added. The evaluation results are shown in Table 2.

Example 13

Pellets and a sample plate were obtained in the same manner as in Example 10 except that 0.05 parts of octadecyl-3-(3,5-di-tert-4-hydroxyphenyl)propionate and 0.03 parts of tris(2,4-di-tert-butylphenyl)phosphite were also added. The evaluation results are shown in Table 2.

Example 14

Pellets and a sample plate were obtained in the same manner as in Example 9 except that 0.3 parts of 2-(2'-hydroxy-5'-methylphenyl)benzotriazole was used as the ultraviolet absorber (B). The evaluation results are shown in Table 2.

Example 15

Pellets and a sample plate were obtained in the same manner as in Example 9 except that 0.04 parts of 2-[2-hydroxy-3,5-bis($\alpha,\alpha$-dimethylbenzyl)phenyl]-2H-benzotriazole was used as the ultraviolet absorber (C). The evaluation results are shown in Table 2.

Comparative Example 8

A sample plate was obtained in the same manner as in Example 9 except that 5,7-di-tert-butyl-3-(3,4-dimethyl-phenyl)-3H-benzofuran-2-one was not added. The evaluation results are shown in Table 2. A change in hue by reproduction was significant.

Comparative Example 9

A sample plate was obtained in the same manner as in Example 9 except that the amount of 5,7-di-tert-butyl-3-(3,4-dimethyl-phenyl)-3H-benzofuran-2-one was changed to 0.15 parts. The evaluation results are shown in Table 2. A drop in transmittance (Tt) was significant.

Comparative Example 10

A sample plate was obtained in the same manner as in Example 10 except that the ultraviolet absorber (B) was not used and 0.32 parts of 2-(3-tert-butyl-5-methyl-2-hydroxyphenyl)-5-chlorobenzotriazole was used as the ultraviolet absorber (C). The evaluation results are shown in Table 2. A change in hue by reproduction and a change in hue by retention heat resistance were significant. A change in hue by reproduction was significant.

TABLE 1

| | Ultraviolet Absorber | | Stabilizer | | Molding Heat Resistance (Reproducibility) Hue | | | Sample Plate | | Spectral Transmission | | Melt Heat Resistance | |
|---|---|---|---|---|---|---|---|---|---|---|---|---|---|
| | Kind | Amount (parts) | Kind | Amount (parts) | b* (virgin) | b'* (repellet) | Δb* | Haze | Tt(%) | 400 nm | 385 nm | ΔE | Tt |
| Ex. 1 | UV-1 UV-2 | 0.3 0.04 | HS-1 | 0.0027 | 0.60 | 0.92 | 0.32 | 0.09 | 88.3 | 33.0 | 0.02 | 5.6 | 83.0 |
| Ex. 2 | UV-1 UV-2 | 0.3 0.04 | HS-1 | 0.0100 | 0.54 | 0.76 | 0.22 | 0.11 | 87.8 | 33.0 | 0.03 | 4.1 | 82.7 |
| Ex. 3 | UV-1 UV-2 | 0.3 0.04 | HS-1 | 0.0500 | 0.50 | 0.63 | 0.13 | 0.09 | 87.4 | 32.8 | 0.03 | 3.5 | 81.2 |
| Ex. 4 | UV-1 UV-2 | 0.3 0.04 | HS-1 HS-2 | 0.0100 0.0500 | 0.56 | 0.77 | 0.21 | 0.12 | 88.3 | 32.9 | 0.03 | 4.1 | 82.8 |
| Ex. 5 | UV-1 UV-2 | 0.3 0.04 | HS-1 HS-2 HS-3 | 0.0027 0.0050 0.0100 | 0.59 | 0.89 | 0.30 | 0.12 | 88.4 | 33.2 | 0.02 | 5.6 | 81.7 |
| Ex. 6 | UV-1 UV-2 | 0.3 0.04 | HS-1 HS-2 HS-3 | 0.0100 0.0500 0.0300 | 0.55 | 0.74 | 0.19 | 0.12 | 87.8 | 32.4 | 0.02 | 4.0 | 81.4 |
| Ex. 7 | UV-1 UV-2 | 0.3 0.04 | HS-1 HS-2 HS-3 | 0.0500 0.0500 0.0300 | 0.48 | 0.60 | 0.12 | 0.14 | 87.3 | 32.3 | 0.02 | 3.3 | 81.0 |
| Ex. 8 | UV-4 UV-2 | 0.3 0.04 | HS-1 | 0.0027 | 0.58 | 0.90 | 0.32 | 0.10 | 88.4 | 32.9 | 0.02 | 5.4 | 83.3 |
| C. Ex. 1 | UV-1 UV-2 | 0.3 0.04 | HS-1 | 0.0000 | 0.62 | 1.33 | 0.71 | 0.09 | 88.4 | 33.2 | 0.02 | 6.7 | 83.7 |
| C. Ex. 2 | UV-1 UV-2 | 0.3 0.04 | HS-1 | 0.0003 | 0.60 | 1.21 | 0.61 | 0.10 | 88.2 | 33.1 | 0.02 | 6.5 | 83.4 |
| C. Ex. 3 | UV-1 UV-2 | 0.3 0.04 | HS-1 | 0.1500 | 0.43 | 0.55 | 0.12 | 0.12 | 85.5 | 32.2 | 0.03 | 2.1 | 78.5 |
| C. Ex. 4 | UV-1 UV-2 | 0.3 0.04 | HS-1 HS-2 | 0.0000 0.0500 | 0.60 | 1.32 | 0.72 | 0.09 | 88.4 | 33.5 | 0.02 | 6.4 | 83.5 |
| C. Ex. 5 | UV-1 UV-2 | 0.3 0.04 | HS-1 HS-2 HS-3 | 0.0003 0.0050 0.0100 | 0.58 | 1.17 | 0.59 | 0.09 | 88.4 | 33.5 | 0.02 | 6.5 | 83.5 |
| C. Ex. 6 | UV-1 UV-2 | 0.3 0.04 | HS-1 HS-2 HS-3 | 0.1500 0.0100 0.0300 | 0.41 | 0.54 | 0.13 | 0.12 | 85.3 | 31.5 | 0.02 | 2.0 | 78.4 |
| C. Ex. 7 | UV-2 | 0.34 | HS-1 | 0.0100 | 1.35 | 1.84 | 0.49 | 0.18 | 87.2 | 19.2 | 0.01 | 4.8 | 82.4 |

Ex.: Example
C. Ex.: Comparative Example

TABLE 2

| | Ultraviolet Absorber | | Stabilizer | | Molding Heat Resistance (Reproducibility) Hue | | | Sample Plate | | Spectral Transmission | | Melt Heat Resistance | |
|---|---|---|---|---|---|---|---|---|---|---|---|---|---|
| | Kind | Amount (parts) | Kind | Amount (parts) | b* (virgin) | b'* (repellet) | Δb* | Haze | Tt(%) | 400 nm | 385 nm | ΔE | Tt |
| Ex. 9 | UV-1 UV-3 | 0.3 0.02 | HS-1 | 0.0027 | 0.65 | 1.02 | 0.37 | 0.10 | 88.0 | 15.3 | 0.01 | 5.9 | 82.5 |
| Ex. 10 | UV-1 UV-3 | 0.3 0.02 | HS-1 | 0.0100 | 0.60 | 0.82 | 0.22 | 0.08 | 88.2 | 15.0 | 0.01 | 4.4 | 82.3 |
| Ex. 11 | UV-1 UV-3 | 0.3 0.02 | HS-1 HS-2 | 0.0100 0.0500 | 0.54 | 0.66 | 0.12 | 0.09 | 88.2 | 15.2 | 0.01 | 4.4 | 82.1 |
| Ex. 12 | UV-1 UV-3 | 0.3 0.02 | HS-1 HS-2 HS-3 | 0.0027 0.0050 0.0100 | 0.62 | 0.81 | 0.19 | 0.12 | 87.8 | 15.5 | 0.01 | 5.7 | 82.6 |
| Ex. 13 | UV-1 UV-3 | 0.3 0.02 | HS-1 HS-2 HS-3 | 0.0100 0.0500 0.0300 | 0.59 | 0.79 | 0.20 | 0.13 | 88.5 | 14.9 | 0.01 | 4.3 | 82.4 |
| Ex. 14 | UV-4 UV-3 | 0.3 0.02 | HS-1 | 0.0027 | 0.67 | 0.99 | 0.32 | 0.12 | 87.7 | 15.0 | 0.01 | 5.6 | 82.9 |
| Ex. 15 | UV-1 UV-5 | 0.3 0.04 | HS-1 | 0.0027 | 0.59 | 0.91 | 0.32 | 0.11 | 88.3 | 35.3 | 0.02 | 5.5 | 83.2 |

TABLE 2-continued

| | Ultraviolet Absorber | | Stabilizer | | Molding Heat Resistance (Reproducibility) Hue | | | | | Sample Plate | | | |
|---|---|---|---|---|---|---|---|---|---|---|---|---|---|
| | | | | | | | | | | | Spectral Transmission | | Melt Heat Resistance |
| | Kind | Amount (parts) | Kind | Amount (parts) | b* (virgin) | b'* (repellet) | Δb* | Haze | Tt(%) | 400 nm | 385 nm | ΔE | Tt |
| C. Ex. 8 | UV-1 UV-3 | 0.3 0.02 | HS-1 | 0.0000 | 0.67 | 1.40 | 0.73 | 0.12 | 87.6 | 15.6 | 0.01 | 7.1 | 83.2 |
| C. Ex. 9 | UV-1 UV-3 | 0.3 0.02 | HS-1 | 0.1500 | 0.44 | 0.57 | 0.13 | 0.15 | 85.9 | 15.8 | 0.01 | 2.5 | 77.8 |
| C. Ex. 10 | UV-3 | 0.32 | HS-1 | 0.0100 | 2.58 | 3.32 | 0.74 | 0.18 | 87.0 | 0.16 | 0.01 | 5.6 | 81.7 |

Ex.: Example,
C. Ex.: Comparative Example

The symbols in the tables represent the following compounds.
UV-1 (B-2): 2-(2'-hydroxy-5'-tert-octylphenyl)benzotriazole
UV-2 (C-2): 2,2'-methylenebis[4-(1,1,3,3-tetramethylbutyl)-6-(2H-benzotriazole-2-yl)phenol]
UV-3 (C-1): 2-(3-tert-butyl-5-methyl-2-hydroxyphenyl)-5-chlorobenzotriazole
UV-4 (B-1): 2-(2'-hydroxy-5'-methylphenyl)benzotriazole
UV-5 (C-3): 2-[2-hydroxy-3,5-bis(α,α-dimethylbenzyl)phenyl]-2H-benzotriazole
HS-1 (D): 5,7-di-tert-butyl-3-(3,4-dimethyl-phenyl)-3H-benzofuran-2-one
HS-2: octadecyl-3-(3,5-di-tert-4-hydroxyphenyl)propionate
HS-3: tris(2,4-di-tert-butylphenyl)phosphite

EFFECTS OF THE INVENTION

A spectacles lens and an optical transparent molded article which are obtained from the polycarbonate resin composition of the present invention are hardly yellowed even if subjected to heat history while having excellent impact resistance, transparency and ultraviolet blocking property and have good total light transmittance, high reproducibility and excellent melt heat resistance. Thus, the effect of the polycarbonate resin composition of the present invention on industries is remarkable.

The invention claimed is:

1. A spectacles lens formed from a polycarbonate resin composition comprising:
   (1) 100 parts by weight of polycarbonate resin (A),
   (2) 0.05 to 0.5 parts by weight of at least one ultraviolet absorber (B) selected from the group consisting of 2-(2'-hydroxy-5'-methylphenyl)benzotriazole (B-1) and 2-(2'-hydroxy-5'-tert-octylphenyl)benzotriazole (B-2),
   (3) 0.01 to 0.3 parts by weight of at least one ultraviolet absorber (C) selected from the group consisting of 2-(3-tert-butyl-5-methyl-2-hydroxyphenyl)-5-chlorobenzotriazole (C-1), 2,2'-methylenebis[4-(1,1,3,3-tetramethylbutyl)-6-(2H-benzotriazole)-2-ylphenol] (C-2) and 2-[2-hydroxy-3,5-bis(α,α-dimethylbenzyl)phenyl]-2H-benzotriazole (C-3), and
   (4) 0.0005 to 0.1 parts by weight of lactone compound (D) represented by the following formula (1):

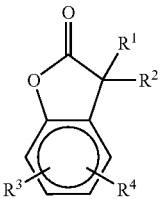

(1)

(wherein $R^1$, $R^2$, $R^3$ and $R^4$ each independently represent a hydrogen atom, an alkyl group having 1 to 20 carbon atoms, an aralkyl group having 7 to 20 carbon atoms or an aryl group having 6 to 15 carbon atoms, and the aralkyl group and the aryl group may have a substituent).

2. The spectacles lens of claim 1, wherein the ultraviolet absorber (B) is 2-(2'-hydroxy-5'-tert-octylphenyl)benzotriazole (B-2).

3. The spectacles lens of claim 1, wherein the ultraviolet absorber (C) is at least one ultraviolet absorber selected from the group consisting of 2-(3-tert-butyl-5-methyl-2-hydroxyphenyl)-5-chlorobenzotriazole (C-1) and 2,2'-methylenebis[4-(1,1,3,3-tetramethylbutyl)-6-(2H-benzotriazole)-2-ylphenol] (C-2).

4. The spectacles lens of claim 1, wherein the lactone compound (D) is a lactone compound represented by the formula (1) in which $R^1$ is a hydrogen atom, $R^2$ is a phenyl group represented by the following formula (2):

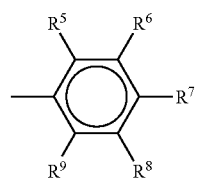

(2)

(wherein $R^5$, $R^6$, $R^7$, $R^8$ and $R^9$ each independently represent a hydrogen atom, an alkyl group having 1 to 4 carbon atoms or an alkoxy group having 1 to 4 carbon atoms), and $R^3$ and $R^4$ are each independently a hydrogen atom or an alkyl group having 1 to 6 carbon atoms.

5. The spectacles lens of claim 1, wherein the lactone compound (D) is 5,7-di-tert-butyl-3-(3,4-dimethyl-phenyl)-3H-benzofuran-2-one or 5,7-di-tert-butyl-3-(2,3-dimethyl-phenyl)-3H-benzofuran-2-one.

6. The spectacles lens of claim 1, wherein the ratio (R) between the ultraviolet absorber (B) and the ultraviolet absorber (C) is 0.05 to 4 in terms of (C)/(B) (weight ratio).

7. The spectacles lens of claim 1, wherein the polycarbonate resin composition further comprises 0.001 to 0.2 parts by weight of phosphorus stabilizer (E) based on 100 parts by weight of the polycarbonate resin (A).

8. The spectacles lens of claim 1, wherein the polycarbonate resin composition further comprises 0.001 to 0.1 parts by weight of hindered phenol stabilizer (F) based on 100 parts by weight of the polycarbonate resin (A).

9. The spectacles lens of claim 1, wherein the polycarbonate resin (A) is a polycarbonate resin obtained with 2,2-bis(4-hydroxyphenyl)propane as a main dihydric phenol component.

10. A method for producing a spectacles lens by melting the polycarbonate resin composition of claim 1, filling it in a mold and compression-molding the molten composition in the mold.

11. An optical polycarbonate resin molding material comprising:
(1) 100 parts by weight of polycarbonate resin (A),
(2) 0.05 to 0.5 parts by weight of at least one ultraviolet absorber (B) selected from the group consisting of 2-(2'-hydroxy-5'-methylphenyl)benzotriazole (B-1) and 2-(2'-hydroxy-5'-tert-octylphenyl)benzotriazole (B-2),
(3) 0.01 to 0.3 parts by weight of at least one ultraviolet absorber (C) selected from the group consisting of 2-(3-tert-butyl-5-methyl-2-hydroxyphenyl)-5-chlorobenzotriazole (C-1), 2,2'-methylenebis[4-(1,1,3,3-tetramethylbutyl)-6-(2H-benzotriazole)-2-ylphenol] (C-2) and 2-[2-hydroxy-3,5-bis(α,α-dimethylbenzyl)phenyl]-2H-benzotriazole (C-3), and
(4) 0.0005 to 0.1 parts by weight of lactone compound (D) represented by the following formula (1):

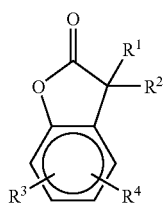

(wherein $R^1$, $R^2$, $R^3$ and $R^4$ each independently represent a hydrogen atom, an alkyl group having 1 to 20 carbon atoms, an aralkyl group having 7 to 20 carbon atoms or an aryl group having 6 to 15 carbon atoms, and the aralkyl group and the aryl group may have a substituent).

12. The molding material of claim 11, wherein the ultraviolet absorber (B) is 2-(2'-hydroxy-5'-tert-octylphenyl)benzotriazole (B-2).

13. The molding material of claim 11, wherein the ultraviolet absorber (C) is at least one ultraviolet absorber selected from the group consisting of 2-(3-tert-butyl-5-methyl-2-hydroxyphenyl)-5-chlorobenzotriazole (C-1) and 2,2'-methylenebis[4-(1,1,3,3-tetramethylbutyl)-6-(2H-benzotriazole)-2-ylphenol] (C-2).

14. The molding material of claim 11, wherein the lactone compound (D) is a lactone compound represented by the formula (1) in which $R^1$ is a hydrogen atom, $R^2$ is a phenyl group represented by the following formula (2):

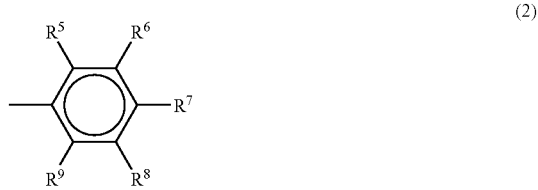

(wherein $R^5$, $R^6$, $R^7$, $R^8$ and $R^9$ each independently represent a hydrogen atom, an alkyl group having 1 to 4 carbon atoms or an alkoxy group having 1 to 4 carbon atoms), and $R^3$ and $R^4$ are each independently a hydrogen atom or an alkyl group having 1 to 6 carbon atoms.

15. The molding material of claim 11, wherein the lactone compound (D) is 5,7-di-tert-butyl-3-(3,4-dimethyl-phenyl)-3H-benzofuran-2-one or 5,7-di-tert-butyl-3-(2,3-dimethyl-phenyl)-3H-benzofuran-2-one.

16. The molding material of claim 11, wherein the ratio (R) between the ultraviolet absorber (B) and the ultraviolet absorber (C) is 0.05 to 4 in terms of (C)/(B) (weight ratio).

17. The molding material of claim 11, wherein the polycarbonate resin composition further comprises 0.001 to 0.2 parts by weight of phosphorus stabilizer (E) based on 100 parts by weight of the polycarbonate resin (A).

18. The molding material of claim 11, wherein the polycarbonate resin composition further comprises 0.001 to 0.1 parts by weight of hindered phenol stabilizer (F) based on 100 parts by weight of the polycarbonate resin (A).

19. The molding material of claim 11, wherein the polycarbonate resin (A) is a polycarbonate resin obtained with 2,2-bis(4-hydroxyphenyl)propane as a main dihydric phenol component.

20. An optical transparent molded article formed from the molding material of claim 11.

21. The molded article of claim 20 which is in the shape of a film or sheet.

22. A method for producing an optical transparent molded article by melting the molding material of claim 11, filling it in a mold and compression-molding the molten material in the mold.

* * * * *